(12) United States Patent
Suddreth et al.

(10) Patent No.: US 10,699,584 B2
(45) Date of Patent: Jun. 30, 2020

(54) SYSTEMS AND METHODS FOR SONIC BOOM AWARE FLIGHT PLANNING

(71) Applicant: HONEYWELL INTERNATIONAL INC., Morris Plains, NJ (US)

(72) Inventors: John G. Suddreth, Cave Creek, AZ (US); Jerry Ball, Peoria, AZ (US); Troy Nichols, Peoria, AZ (US); Mark A. Giddings, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 29 days.

(21) Appl. No.: 15/910,072

(22) Filed: Mar. 2, 2018

(65) Prior Publication Data
US 2019/0272762 A1   Sep. 5, 2019

(51) Int. Cl.
*G08G 5/00* (2006.01)
*G01C 23/00* (2006.01)
*B64C 30/00* (2006.01)

(52) U.S. Cl.
CPC ......... *G08G 5/0039* (2013.01); *G01C 23/005* (2013.01); *G08G 5/0021* (2013.01);
(Continued)

(58) Field of Classification Search
CPC .. G08G 5/0039; G08G 5/0021; G08G 5/0073; G01C 23/005
See application file for complete search history.

(56) References Cited

U.S. PATENT DOCUMENTS

| 3,737,119 A | 6/1973 | Cheng |
| 6,389,355 B1 * | 5/2002 | Gibbs ................. G08G 5/0021 434/38 |

(Continued)

FOREIGN PATENT DOCUMENTS

| JP | 2004217105 A | 8/2004 |
| WO | 2005050601 A1 | 6/2005 |

OTHER PUBLICATIONS

USPTO Office Action for U.S. Appl. No. 15/798,692 dated Jul. 9, 2018.
(Continued)

*Primary Examiner* — Ramsey Refai
(74) *Attorney, Agent, or Firm* — Lorenz & Kopf, LLP

(57) ABSTRACT

Flight planning systems and methods are provided, which augment supersonic flight planning via the integration of sonic boom forecast data. In embodiments, the flight planning system includes a display device, a pilot input interface, and a controller architecture coupled to the display device and to the pilot input interface. During system operation, the controller architecture receives flight plan criteria entered via the pilot input interface. The controller architecture then endeavors to generate or construct a boom-regulated flight plan, which includes at least one supersonic flight plan segment, in accordance with the flight plan criteria. If unable to construct a boom-regulated flight plan, the controller architecture generates a visual notification on the display device. The visual notification can include, for example, a warning that an excessive sonic boom or overpressure event may occur during execution of the flight plan by an aircraft, absent modifications to the flight plan.

20 Claims, 4 Drawing Sheets

(52) U.S. Cl.
CPC ......... *G08G 5/0034* (2013.01); *G08G 5/0052* (2013.01); *G08G 5/0073* (2013.01); *B64C 30/00* (2013.01)

(56) References Cited

U.S. PATENT DOCUMENTS

| | | | |
|---|---|---|---|
| 6,905,091 | B2 | 6/2005 | Berson et al. |
| 7,581,697 | B1* | 9/2009 | Hagemeister ........... B64C 30/00 244/1 R |
| 7,599,805 | B2* | 10/2009 | Pilon ...................... G01H 17/00 244/1 N |
| 8,145,366 | B1* | 3/2012 | Haering, Jr. .......... G01C 23/00 244/1 N |
| 10,209,122 | B1* | 2/2019 | Suddreth ................ G01H 17/00 |
| 2005/0098681 | A1 | 5/2005 | Berson et al. |
| 2017/0132356 | A1 | 5/2017 | Shen |
| 2019/0164436 | A1* | 5/2019 | Suddreth ............. G08G 5/0039 |
| 2019/0164437 | A1* | 5/2019 | K ........................ G08G 5/0013 |

OTHER PUBLICATIONS

Joslin et al.; Sonic Boom Awareness in the Civil Supersonic Cockpit; Flight Test Safety Workshop, Apr. 23-25, 2013.
Carlson, H.W. et al.; Simplified Sonic-Boom Prediction; NASA Technical Paper 1122, 1978.
Smith-Velazquez, L.M., et al.; Synthetic vision display with integral sonic boom predictions; Degraded Environments: Sensing, Processing, and Display 2017.
USPTO Notice of Allowance for U.S. Appl. No. 15/798,692 dated Oct. 11, 2018.

* cited by examiner

SYSTEMS AND METHODS FOR SONIC BOOM AWARE FLIGHT PLANNING

STATEMENT REGARDING FEDERALLY SPONSORED RESEARCH OR DEVELOPMENT

This invention was made with Government support under Contract No. NND15AA35C, awarded by NASA/Armstrong Flight Research Ctr. The Government has certain rights in the invention.

TECHNICAL FIELD

The following disclosure relates generally to flight planning and, more particularly, to systems and methods enhancing supersonic flight planning via the integration of sonic boom forecast data.

BACKGROUND

Regulatory authorities currently restrict over-land supersonic flight of civilian aircraft (A/C) throughout much of the populated world. In the United States, for example, current Federal Aviation Administration regulations prohibit supersonic flight of civilian A/C over land. Such restrictions are generally motived by noise abatement rationale and a desire to protect ground structures, such as building windows, from damage due to the pressure waves generated during supersonic air travel. These concerns notwithstanding, regulatory authorities have indicated that existing supersonic over-land flight restrictions might soon be eased, within limits. Industry attention has thus turned to the development and production of so-called "low boom" A/C suitable for service as commercial airliners or passenger jets operable at lower Mach speeds. As industry efforts increasingly focus on the development of low boom A/C, a corresponding demand arises for the development of tools and systems supporting civilian A/C engaged in supersonic flight, while ensuring adequate control of the pressure waves and noise levels produced by such supersonic air travel.

BRIEF SUMMARY

Flight planning systems and methods are provided, which augment supersonic flight planning via the integration of sonic boom forecast data. In various embodiments, the flight planning system includes a display device, a pilot input interface, and a controller architecture coupled to the display device and to the pilot input interface. During system operation, the controller architecture receives flight plan criteria entered via the pilot input interface. The controller architecture then endeavors to construct a boom-regulated flight plan, which includes at least one supersonic flight plan segment, conforming with the entered flight plan criteria. If unable to construct such a boom-regulated flight plan, the controller architecture generates a corresponding visual notification on the display device. The visual notification can include, for example, a warning that an excessive sonic boom or "overpressure event" may occur during execution of the flight plan, if not modified in some manner. Additionally, in certain embodiments, the visual notification may include symbology identifying a geographical location at which the excessive sonic boom or overpressure event is projected to occur.

In another embodiment, a method is carried-out by a flight planning system including a display device and a pilot input interface. The method includes the step or process of generating a baseline flight plan, which includes at least one supersonic flight plan segment, in accordance with flight plan criteria entered via the pilot input interface. The flight planning system then establishes whether an overpressure event is forecast to occur at selected intervals along the supersonic flight plan segment due to the predicted occurrence of a sonic boom having a magnitude exceeding a boom tolerance threshold. If an overpressure event is forecast to occur at a particular interval along an analyzed supersonic flight plan segment, the flight planning system determines whether the forecast overpressure event can be resolved through an acceptable modification to the baseline flight plan. If determining that the overpressure event cannot be resolved through an acceptable modification to the baseline flight plan, the flight planning system further generates a corresponding visual notification on the display device.

The methods set-forth above and described elsewhere in this document can be implemented utilizing program products, such as software applications executed on suitably-equipped flight planning systems and disseminated in any suitable manner. Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
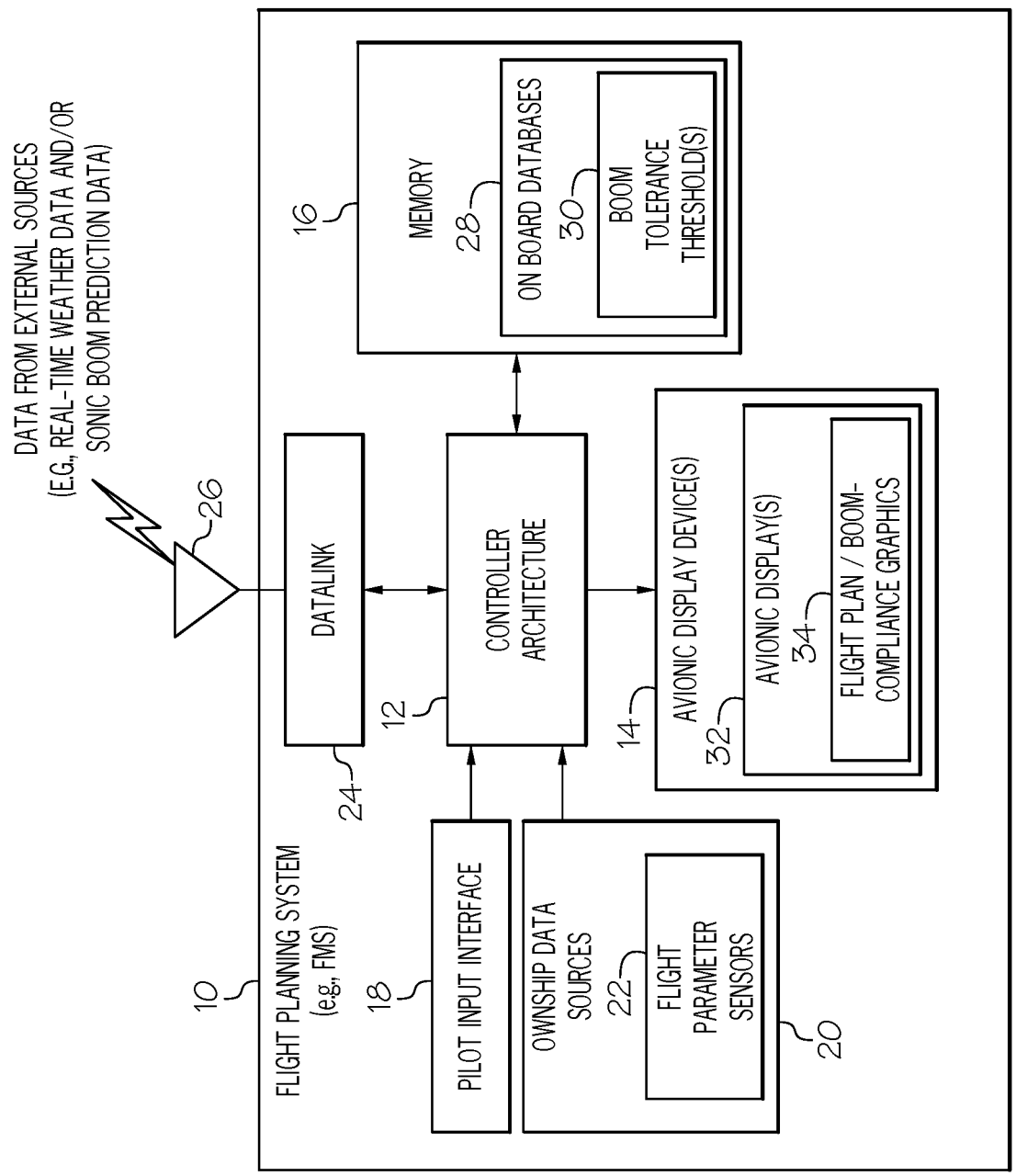
FIG. 1 is a block diagram of a flight planning system, which supports enhanced supersonic flight planning through the integration of sonic boom forecast data and which is illustrated in accordance with an exemplary embodiment of the present disclosure.

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described flight planning system.

Co-pending Patent Applications Incorporated by Reference

The following applications are owned by the present assignee at the time of filing this document with the United States Patent and Trademark Office (USPTO), generally relate to the present subject matter, and are hereby incorporated by reference: U.S. patent application Ser. No. 15/798,692, entitled "SYSTEMS AND METHODS FOR GENERATING AVIONIC DISPLAYS INCLUDING FORECAST OVERPRESSURE EVENT SYMBOLOGY," filed with the USPTO on Oct. 31, 2017; and U.S. patent application Ser. No. 15/825,916, similarly entitled "SYSTEMS AND METHODS FOR GENERATING AVIONIC DISPLAYS INCLUDING FORECAST OVERPRESSURE EVENT SYMBOLOGY," filed with the USPTO on Nov. 29, 2017.

Overview

Flight planning systems and methods, which support enhanced or augmented supersonic flight planning through the strategic integration of sonic boom forecast data, are provided. Embodiments of the flight planning system seek to automate, to the extent appropriate, the generation boom-regulated flight plans; that is, flight plans containing supersonic flight plan segments, which can be flown by an aircraft (A/C) without the production of excessive sonic booms. In the present context, a sonic boom is considered "excessive" when an intensity of the sonic boom (e.g., a pressure or decibel level) exceeds a predetermined threshold value referred to as a "boom tolerance threshold." The boom tolerance threshold may have a static or fixed value in certain embodiments. Alternatively, the boom tolerance threshold may have a variable value, which is actively adjusted by the flight planning system based upon one or characteristics of a given sonic boom prediction; e.g., a geographical location or time of day at which a sonic boom is predicted to occur. The occurrence of an excessive (threshold-exceeding) sonic boom is also referred to herein as an "overpressure event."

During operation, the flight planning system endeavors to construct flight plans in accordance with specified flight plan criteria. The flight plan criteria sets-out the pertinent constraints of the flight plan, such as starting waypoint (origin), ending waypoint (destination), Estimated Time of Departure (ETD), and the like. Such flight plan criteria may be entered utilizing any suitable pilot input interface, such as an input interface associated with a Flight Management System (FMS) included within or otherwise associated with the flight planning system. As a specific example, the flight plan criteria may be entered by a pilot utilizing an alphanumeric keypad provided on a Multifunction Control and Display Unit (MCDU). Following entry of the flight plan criteria, the flight planning system endeavors to generate a boom-regulated flight plan satisfying the entered flight plan criteria. If successful in generating a boom-regulated flight plan satisfying the flight plan criteria, the flight planning system may present the flight plan on a display device to, for example, allow pilot review and confirmation before final submission to the A/C avionics. Conversely, if unable to generate a boom-regulated flight plan satisfying the flight plan criteria, the flight planning system may produce a visual notification on an avionic display alerting a pilot to this fact. In addition to alerting the pilot of the impending occurrence of an excessive sonic boom or "overpressure event" should the flight plan be executed in its originally-generated or unmodified form, the visual notification may also convey other information useful in evaluating the causal factors underlying the system's inability to generate a boom-regulated flight plan, such as symbology identifying the geographical location or locations at which any excessive sonic booms are predicted to occur.

Various different data sources and analysis techniques may be employed by the flight planning system in obtaining sonic boom forecast data, which is then utilized to determine whether a boom-regulated flight plan can be established for a particular set of flight plan criteria. In certain embodiments, the flight planning system may retrieve sonic boom predictions from a remote entity, such as a cloud-based service or server farm, dedicated to performing relatively complex forecasting algorithms. The flight planning system may submit "what-if" queries to the remote entity for sonic boom forecast data based upon projected flight parameters at selected intervals along an initially-generated, baseline flight plan; and receive, in return, sonic boom forecast data. The flight planning system may then utilize the sonic boom forecast data to determine whether an excessive sonic boom is predicted to occur at any particular point or juncture along the flight plan, absent modifications thereto. If an excessive sonic boom is predicted to occur, the flight planning system may seek to resolve the excessive sonic boom prediction through acceptable modifications to the A/C flight parameters at this juncture of the flight plan. For example, the flight planning system may determine whether the excessive sonic boom prediction can be removed by submitting additional "what-if" queries with iterative modifications to speed, and perhaps horizontal (position latitude and longitude) parameters. If determining that the excessive sonic boom prediction can be resolved without excessive deviation from the original flight plan, the flight planning system may automatically the flight plan accordingly and repeats this process, as needed, until arriving at boom-compliant flight plan. If unable to resolve one or more excessive sonic boom predictions, the flight planning system may instead that a boom-regulated flight plan cannot be established for the given flight plan criteria set and alert the pilot accordingly.

In the above-described manner, the flight planning system is imparted with a heighted intelligence or awareness of sonic boom forecast data, which is considered in generating boom-compliant flight plans involving supersonic A/C flight. Generally, this heightened intelligence will remain transparent to the pilot as few, if any additional pilot interactions will be required by the flight planning system under typical circumstances. Instead, pilot interaction may be only sought when the flight planning system is unable to resolve an excessive sonic boom prediction in embodiments, as described above and discussed more fully below. Thus, through implementation of the systems and methods presented herein, an appreciable reduction in the occurrence of excessive sonic booms or overpressure events during supersonic A/C flight can be realized with negligible increases in pilot workload. Further, in implementations in which generation of the sonic boom prediction data is outsourced to a remote entity, relatively complex, computationally-intensive sonic boom forecasting algorithms can be conducted to optimize the sonic boom predictions, while the processing loads placed on the flight planning system are minimized. An overarching description of an exemplary flight planning system suitable for performing such processes will now be described in conjunction with FIG. 1.

Example of System for Integrating Sonic Boom Awareness into Supersonic Flight Planning FIG. 1 is a block diagram of a flight planning system 10, as illustrated in accordance with an exemplary and non-limiting embodiment of the present disclosure. Flight planning system 10 may assist in the generation of boom-regulated flight plans for one or more A/C; e.g., flight planning system 10 may be utilized to generate boom-regulated flight plans for a non-illustrated A/C, which carries or is equipped with system 10. As schematically depicted in FIG. 1, flight planning system 10 includes the following components or subsystems, each of which may assume the form of a single device or multiple interconnected devices: a controller architecture 12, at least one avionic display device 14, computer-readable storage media or memory 16, and a pilot input interface 18. Flight planning system 10 may further contain ownship data sources 20 including, for example, an array of flight parameter sensors 22. Flight planning system 10 may also contain a datalink subsystem 24 including an antenna 26, which may wirelessly transmit data to and receive data from various sources external to system 10, such as a cloud-based forecasting service of the type discussed below.

Although schematically illustrated in FIG. 1 as a single unit, the individual elements and components of flight planning system 10 can be implemented in a distributed manner utilizing any practical number of physically-distinct and operatively-interconnected pieces of hardware or equipment. When system 10 is utilized to construct supersonic flight plans for a manned A/C, the various components of flight planning system 10 will typically all be located onboard the A/C. Comparatively, in implementations in which flight planning system 10 is utilized to construct flight plans for a remotely-controlled UAV or A/C, certain components of flight planning system 10 may be carried by the UAV, while other components may be situated at the ground-based station or facility from which the UAV is piloted. For example, in this latter instance, display device(s) 14, pilot input interface 18, and some portion of memory 16 may be located offboard the UAV.

The term "controller architecture," as appearing herein, broadly encompasses those components utilized to carry-out or otherwise support the processing functionalities of flight planning system 10. Accordingly, controller architecture 12 can encompass or may be associated with any number of individual processors, flight control computers, navigational equipment pieces, computer-readable memories (including or in addition to memory 16), power supplies, storage devices, interface cards, and other standardized components. Controller architecture 12 may include or cooperate with any number of firmware and software programs (generally, computer-readable instructions) for carrying-out the various process tasks, calculations, and control/display functions described herein. Controller architecture 12 may exchange data with one or more external sources to support operation of flight planning system 10 in embodiments. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

Memory 16 can encompass any number and type of storage media suitable for storing computer-readable code or instructions, as well as other data generally supporting the operation of flight planning system 10. In certain embodiments, memory 16 may contain one or more databases 28, such as geographical (terrain), runway, navigational, and historical weather databases, which may be updated on a periodic or iterative basis to ensure data timeliness. The databases maintained in memory 16 may be shared by other systems onboard the A/C carrying flight planning system 10, such as an Enhanced Ground Proximity Warning System (EGPWS) or a Runway Awareness and Advisory System (RAAS). Memory 16 may also store one or more values associated with the below-described boom tolerance threshold, as generically represented by box 30. Finally, in at least some implementations of flight planning system 10, one or more sonic boom profiles specific to the ownship A/C or, perhaps, a range of A/C types may be stored within memory 16. Additional discussion of such A/C-specific sonic boom profiles is provided below.

Flight parameter sensors 22 supply various types of data or measurements to controller architecture 12 during A/C flight. A non-exhaustive list of such data or measurements includes initial reference system measurements, Flight Path Angle (FPA) measurements, airspeed data, groundspeed data, altitude data, attitude data including pitch data and roll measurements, yaw data, data related to A/C weight, time/date information, heading information, data related to atmospheric conditions, flight path data, flight track data, radar altitude data, geometric altitude data, wind speed and direction data, and fuel consumption data. Further, in certain embodiments of system 10, controller architecture 12 and the other components of flight planning system 10 may be included within or cooperate with any number and type of systems commonly deployed onboard A/C including, for example, an FMS, an Attitude Heading Reference System (AHRS), an Instrument Landing System (ILS), and/or an Inertial Reference System (IRS), to list but a few examples.

With continued reference to FIG. 1, avionic display device 14 (or devices 14) can include any number and type of image generating devices on which one or more avionic displays may be produced. When flight planning system 10 is utilized to construct flight plans for a manned A/C, display device 14 may be affixed to the static structure of the A/C cockpit as, for example, a Head Down Display (HDD) or Head Up Display (HUD) unit. Alternatively, display device 14 may assume the form of a movable display device (e.g., a pilot-worn display device) or a portable display device, such as an Electronic Flight Bag (EFB), a laptop, or a tablet computer carried into the A/C cockpit by a pilot. Similarly, when flight planning system 10 is utilized to construct flight plans for and to pilot a UAV or remotely-piloted A/C, display device 14 may be realized as an HDD or HUD unit affixed to the static structure of a control facility, as a portable electronic device carried into such a control facility by a pilot, or as a movable display device worn by a pilot when remotely operating the UAV.

At least one avionic display 32 is generated on display device 14 during operation of flight planning system 10; the term "avionic display" defined as synonymous with the term "aircraft-related display" and encompassing displays generated in textual, graphical, cartographical, and other formats. Avionic display 32 is generated to include various visual elements or graphics 34, which may be referenced by a pilot during the supersonic flight planning process. Graphics 34 can include, for example, textual readouts relating entered flight plan criteria or text annunciations indicating whether flight planning system 10 is able to generate a boom-regulated flight plan satisfying such criteria. The avionic display or displays generated by flight planning system 10 can include alphanumerical input displays of the type commonly presented on the screens of MCDUs, such as that described below in conjunction with FIG. 3, as well as Control Display Units (CDUs) generally. Flight planning system 10 can also generate various other types of displays on which symbology, text annunciations, and other graphics pertaining to flight planning and to the projected occurrence of excessive sonic booms. For example, embodiments of flight planning system 10 can generate graphics 34 on one or more two dimensional (2D) avionic displays, such as a horizontal or vertical navigation display; and/or on one or more three dimensional (3D) avionic displays, such as a Primary Flight Display (PFD) or an exocentric 3D avionic display. An exemplary method, which is suitably implemented by flight planning system 10 in performing processing tasks related to boom-regulated flight planning, will now be described in conjunction with FIG. 2.

Examples of Methods for Sonic Boom Aware Flight Planning

Figure 2:
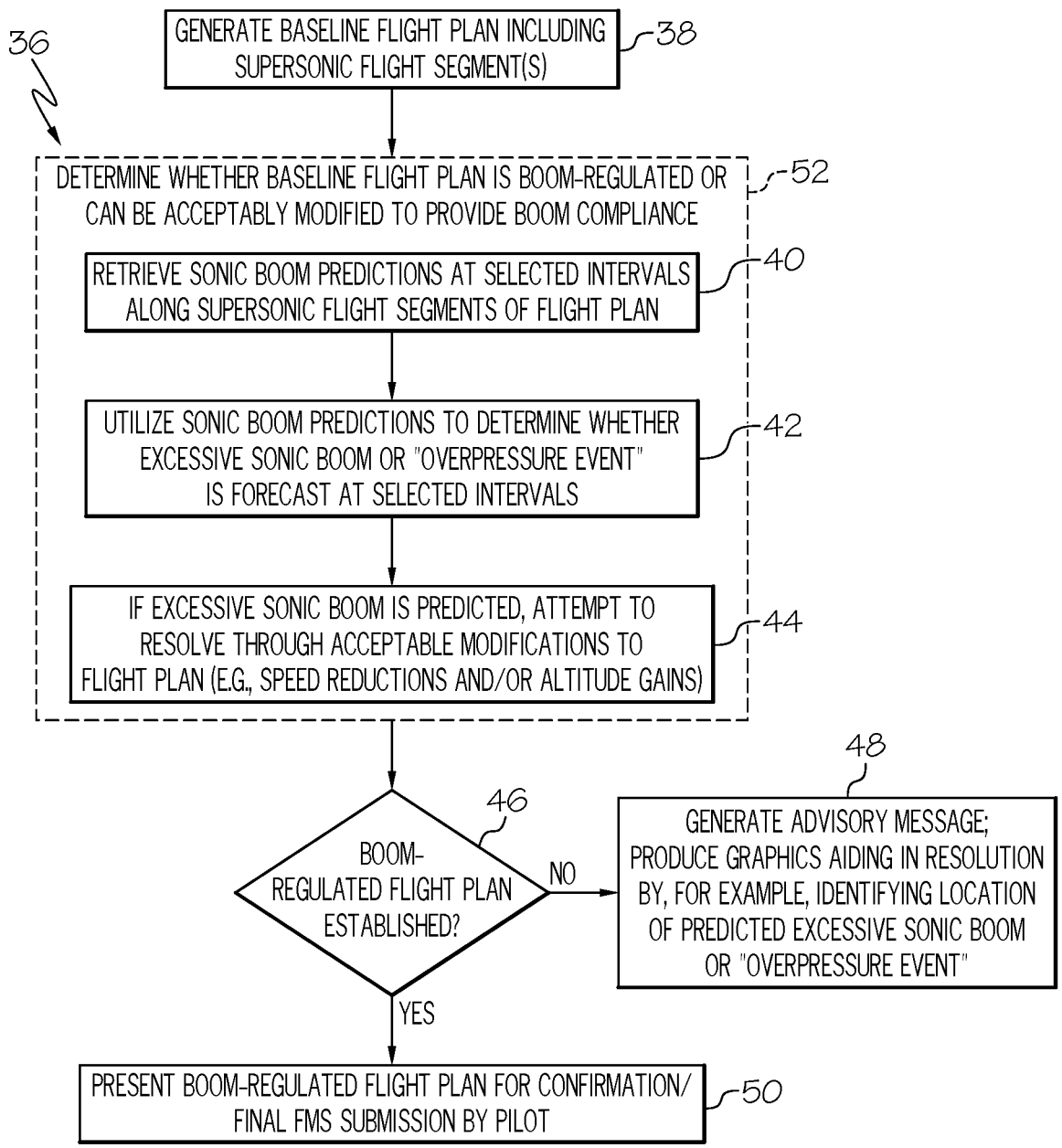
FIG. 2 is a flowchart of a method suitably carried-out by the flight planning system shown in FIG. 1 when receiving requests to generate flight plans including supersonic flight plan segments, as further illustrated in accordance with an exemplary embodiment of the present disclosure.

FIG. 2 is a flowchart setting-forth an exemplary method 36, which can be carried-out by flight planning system 10 (FIG. 1) to enhance or augment supersonic flight planning through the integration of sonic boom forecast data into the flight planning process. In this example, flight planning method 36 includes a number of computer-implemented functions or process steps identified as STEPS 38, 40, 42, 44, 46, 48, 50, with STEPS 40, 42, 44 performed as part of a larger PROCESS BLOCK 52. Depending upon the particular manner in which method 36 is implemented, each illustrated step may entail a single process or multiple sub-processes. The steps shown in FIG. 2 and described below are provided by way of non-limiting example only. In other embodiments of method 36, additional process steps may be performed, certain steps may be omitted, and/or the illustrated steps may be performed in alternative sequences.

Flight planning method 36 commences at STEP 38 with the generation of a baseline flight plan containing at least one supersonic flight plan segment; that is, a segment or portion of the flight plan calling for supersonic A/C flight. The baseline flight plan is generated in accordance specified flight plan criteria, which can be entered into flight planning system 10 by a pilot utilizing input interface 18. Such flight plan criteria can include a starting waypoint, an ending waypoint, a ETD, and other relevant parameters. A pilot may manually program such flight plan criteria into flight planning system 10, which may include or assume the form of an FMS, utilizing a designated physical interface or Graphic User Interface (GUI). For example, in one embodiment, the designated pilot input interface can be alphanumeric keypad provided on an MCDU. Afterwards, the pilot may review the MCDU display screen to ensure accurate entry of the flight plan parameters and then utilize the MCDU keypad to submit the flight plan to the avionics suite of the A/C. Alternatively, the flight plan parameters may be automatically submitted to an FMS or, more generally, flight planning system 10 from another device, such as an EFB or tablet, utilized for pre-planning purposes. Such a process is still considered pilot entry in the present context as a pilot will initiate this data transfer process. As a still further possibility, flight planning system 10 may be implemented utilizing such an EFB, tablet, or other portable electronic device and may interface with (rather than include) an FMS when performing the process tasks described herein.

With continued reference to FIG. 2, flight planning method 36 next advances to PROCESS BLOCK 52 during which flight planning system 10 determines whether the initially-generated baseline flight plan is appropriately deemed "boom-regulated." Stated differently, during PROCESS BLOCK 42, system 10 assesses whether any sonic booms predicted to occur during execution of the baseline flight plan are sufficiently limited so as to conform with the boom tolerance threshold. If determining that the initially-generated baseline is not properly "boom-regulated," flight planning system 10 further determines whether the baseline flight plan can be modified, within acceptable limits, to arrive at a boom-regulated flight plan. In this regard, flight planning system 10 may carry-out an iterative process involving STEPS 40, 42, 44 shown in FIG. 2 and discussed below. The performance of STEPS 40, 42, 44 and, more generally, the determination of whether an originally-generated flight plan is "boom-regulated" or can be modified to become "boom-regulated" may only be required when supersonic flight is called for over at least some portion of the baseline flight plan.

At STEP 40 of flight planning method 36, flight planning system 10 utilizes performance models to project future A/C flight parameters at selected intervals along the supersonic flight plan segment or segments of the flight plan. In embodiments, flight planning system 10 may project the relevant A/C flight parameters, and retrieve the below-described sonic boom forecast data, at intervals along the baseline flight plan. For example, flight planning system 10 may project flight parameters for all supersonic flight plan segments at intervals having a relatively tight spacing and, perhaps, the minimum spacing permitted by the resolution of a terrain database included in databases 30 (FIG. 1). The flight parameters projected by flight planning system 10 can be determined utilizing established A/C performance models, as well as other pertinent data inputs including forecasted wind and weather conditions. The flight parameters projected by flight planning system 10 can include the FPA, speed, altitude, horizontal location (longitude and latitude), and any other parameter influencing sonic boom-production at each examined juncture or interval of supersonic flight plan segments.

As indicated above, flight planning system 10 utilizes the projected flight parameters to determine whether an excessive sonic boom or overpressure event is predicted at each interval along the supersonic flight plan segments. In certain implementations, flight planning system 10 may retrieve sonic boom forecast data from a remote entity, such as a cloud-based service or server farm, dedicated to performing relatively complex forecasting algorithms. Specifically, in this case, flight planning system 10 may submit "what-if" queries to such a remote entity, with such queries soliciting sonic boom forecast data at the selected intervals based upon the projected flight parameters. Flight planning system 10 may then receive, in return, the sonic boom forecast data for each flight plan internal under consideration. In addition to indicating whether a sonic boom is anticipated to occur, the sonic boom forecast data may also indicate a severity (e.g. pressure or decibel level) of the predicted sonic boom and perhaps other information associated therewith, such as data describing the projected propagation of the sonic boom through three dimensional space. By outsourcing the sonic boom predictions from system 10 to a remote entity, computationally-intensive forecasting algorithms can be performed by the remote external entity to increase the speed and accuracy with which the sonic boom predictions are generated, while minimizing processing demands placed on controller architecture 12. This notwithstanding, flight planning system 10 can independently generate the sonic boom forecast data in further embodiments of method 36.

Whether performed by flight planning system 10, by a remote entity in wireless communication with system 10, or by a combination thereof, the algorithms utilized to generate sonic boom forecast data during STEP 40 of method 36 may consider a wide range of static and dynamic inputs. Such inputs will typically include meteorological conditions impacting the propagation of sonic pressure waves through the ambient environment as it currently exists; e.g., current wind speeds and directions, air temperatures, humidity levels, and information regarding the presence of airborne precipitation (e.g., rain, sleet, snow, or hail) is appropriately considered. To ensure timeliness, data regarding current meteorological conditions may be extracted from XM weather broadcasts or other weather forecast service reports. Additionally or alternatively, measurements of current meteorological conditions can be obtained from flight parameter sensors 22 included within flight planning system 10.

In certain embodiments, A/C-specific sonic boom profiles may be further taken into account when generating the sonic boom forecast data during STEP 40 of flight planning method 36. When so considered, such A/C-specific sonic boom profiles may generally represent or emulate the general three dimensional pressure wave shape created by a particular A/C when traveling at supersonic speeds above the below-described Mach cutoff speed. The sonic boom profile for a given A/C may be constructed based the physical characteristics of the A/C including, for example, A/C shape, weight class, and engine configuration. Flight planning system 10 may store one or more A/C-specific sonic boom profiles in memory 16 and recall such profiles during the course of method 36. As a more specific example, flight planning system 10 may store a sonic boom profile specific to the ownship A/C in memory 16 and recall this sonic boom profile when needed; e.g., in this case, system 10 may recall the A/C-specific sonic boom profile when performing onboard forecasting algorithms or instead provide this information to the above-described remote entity for consideration in generating the sonic boom forecast data when submitting the above-described "what-if" queries thereto.

Advancing to STEP 42 of flight planning method 36, flight planning system 10 next analyzes the recently-obtained sonic boom predictions to determine whether a particular sonic boom prediction is considered excessive or threshold-exceeding when compared to the corresponding boom tolerance threshold. Flight planning system 10 may determine whether a predicted sonic boom is considered "excessive" in the following manner. First, flight planning system 10 identifies a reference magnitude of the predicted sonic boom for comparison to the corresponding boom tolerance threshold. The reference magnitude of the predicted sonic boom may be the peak magnitude of the sonic boom, such as the maximum anticipated pressure or decibel level of the sonic boom, considered in its entirety. Alternatively, the reference magnitude of the predicted sonic boom may be an estimated pressure or decibel level taken at a particular location encompassed by a sonic boom prediction, such as the pressure or decibel level taken at the projected origin of the sonic boom or at a location at which the sonic boom is projected to initially strike the ground or other surface of the Earth. This latter approach may be particularly beneficial in more accurately assessing the likely impact of the sonic boom on human populations, manmade structures, and other ground-based objects in proximity of the excessive sonic boom.

In certain implementations, a single or universal boom tolerance threshold value may be assigned to the boom tolerance threshold, stored in memory 16, and recalled by controller architecture 12 during STEP 42 of flight planning method 36. In such implementations, flight planning system 10 may utilize the same boom tolerance threshold in evaluating all sonic boom predicted, regardless of the particular locations or other characteristics of a given sonic boom prediction. While a single value is assigned to the sonic boom threshold in such embodiments, flight planning system 10 may allow the value of the boom tolerance threshold to be modified through software updates, pilot input, by ATC communications, or in another manner. In other implementations of method 36 and system 10, the boom tolerance threshold may be assigned a dynamic or variable value, which is actively modified by flight planning system 10 as a function of one or more parameters relating to a given sonic boom prediction. In this latter instance, a range of boom tolerance threshold values may be stored in memory 16 and differentiated by time of day, varying geographical zones, and other such differentiating factors, as discussed more fully below.

In embodiments, the boom tolerance threshold may be assigned a georeferenced value in embodiments and, thus, may vary based upon the particular geographical location or region in which a sonic boom is predicted to occur. By actively varying the value of the sonic boom threshold in relation to geographical region, more intensive sonic booms (that is, sonic booms having greater pressures or decibel levels) may be permitted within certain geographical regions, such as those that are relatively unpopulated. Conversely, only sonic booms of relatively low intensities may be permitted in other geographical regions, such as those that are densely populated, or sonic booms may be strictly banned in such regions. Such georeferenced values can be varied as a function of local or regional noise abatement regulations, political boundaries, the type and vulnerability of manmade structures within a region to pressure wave damage, proximity to land if a sonic boom is forecast to occur over water, and other parameters. In further embodiments, the value of the boom tolerance threshold can be adjusted in relation to other characteristic pertaining to a sonic boom prediction. For example, the values assigned to boom tolerance threshold can be varied based upon the time-of-day at which a particular sonic boom is predicted to occur; e.g., in this latter regard, higher (more permissive) values may be assigned to the boom tolerance threshold during waking hours, while lower (more stringent) threshold values may apply at times during which local populations are largely asleep and, therefore, prone to disturbance by excessively loud sonic booms.

In the above-described manner, flight planning system 10 determines whether the reference magnitude of any sonic boom prediction(s) remain below a corresponding boom tolerance threshold and, therefore, whether an excessive sonic boom is forecast to occur. If determining that one or more sonic booms are predicted to occur during execution of the proposed flight plan, but that the predicted sonic boom or booms are not excessive, the baseline flight plan may be considered adequately boom-regulated. Accordingly, flight planning system 10 may progress to STEP 50 of method 36, as described below.

Conversely, if determining that an excessive sonic boom is forecast to occur during a particular interval of the baseline flight plan during STEP 44, flight planning system 10 seeks to resolve the excessive sonic boom prediction through acceptable modifications to the flight parameters of the baseline flight plan. Such modification can include, for example, speed reductions or altitude gains sufficient to remove the excessive sonic boom prediction.

During STEP 44 of method 36, flight planning system 10 determines whether any excessive sonic boom predictions or anticipated overpressure events can be resolved through acceptable modifications to the baseline flight plan. Flight planning system 10 may render this determination by virtually making proposed modifications to the projected flight parameters at the interval or intervals under consideration and then repeating STEPS 40, 42, as appropriate, to establish whether such modifications are sufficient to remove the excessive sonic boom prediction. With respect to changes in altitude, flight planning system 10 may retrieve additional sonic boom predictions for the flight plan interval with proposed increases in altitude to determine whether the predicted sonic boom can be averted or at least be sufficiently suppressed to no longer be classified as "excessive." In one embodiment, "what-if" altitude requests submitted by flight planning system 10 (FIG. 1) may be based on standard or reduced vertical separation minima (RVSM). If an altitude modification is determined to be sufficient to resolve the excessive sonic boom prediction, and the altitude modification is within a predetermined range of the altitude of the baseline flight plan, an acceptable resolution is reached. Flight planning system 10 modifies the flight plan accordingly and repeats this process, as appropriate, until arriving at boom-compliant flight plan. A similar process is performed to determine whether an acceptable degree of A/C deceleration, as performed ahead of an excessive sonic boom prediction, would likewise be sufficient to remove the excessive sonic boom prediction or anticipated overpressure event.

In various embodiments, flight planning system 10 may generate visual alerts or otherwise provide pilot notification if a predicted overpressure event or excessive sonic boom can be resolved, but only through a relatively significant deviation in A/C parameters, such as a pronounced change in altitude or speed. It may be desirable to notify a pilot of pronounced reductions in speed, for example, due to the negative impact of such speed reductions on fuel economy and A/C range. In conjunction with notifying a pilot of relatively pronounced speed reduction, flight planning system 10 may also afford the pilot with an opportunity to instead perform other pre-emptive modification to the flight plan, such as minor adjustments in altitude, to avert the excessive sonic boom prediction or anticipated overpressure event. Similarly, if determining that a predicted overpressure event can be resolved, but only through a relatively large deviation in altitude from the original altitude at a particular internal along the baseline flight plan, flight planning system 10 may again generate an advisory message on display device 14 or require pilot confirmation prior to modifying the baseline flight plan. Here, it will be noted that pilots often have a decreased autonomy in implementing significant altitude changes, as compared to changes in speed, absent ATC notification and approval. Consequently, embodiments of flight planning system 10 may further require any in-flight modifications to altitude to be brought to a pilot's attention and confirmed by pilot input before execution. Furthermore, if vectors received from an ATC should be inconsistent with a current flight plan, flight planning system 10 may similarly generate a visual alert if the deviation is predicted to drive an excessive sonic boom or overpressure event.

Flight planning system 10 beneficially considers a range of potential solutions in resolving an excessive sonic boom prediction in a preferred order or hierarchy during STEP 44 of method 36. For example, navigational solutions involving A/C deceleration to reduced speeds, which nonetheless remain supersonic may be initially contemplated or analyzed as preferred solution. As a general rule, it will often be the case that deceleration to reduced supersonic speeds can be implemented with minimal impact on fuel consumption, emission levels, and timeliness; thus, speed reductions enabling the A/C to continue to travel at supersonic speeds, while preempting the anticipated occurrence of an excessive sonic boom or overpressure event may be first considered as an optimal solution. If deceleration to reduced supersonic speeds is found insufficient to remove the excessive sonic boom prediction, however, flight planning system 10 may next examine whether a resolution can be reached through an acceptable change in altitude. Typically, such an altitude-based solution will involve climbing to particular Above Ground Level (AGL) altitude or Flight Level (FL), providing that such an FL is unoccupied by other A/C. Again, such gains in altitude can typically be carried-out with relatively little impact on timeliness and fuel consumption. Furthermore, as noted above, significant deviations in altitude may require pilot confirmation and possibly ATC approval, with appropriate prompts generated by system 10 on avionic display device 14.

Continuing with the instant example, if the A/C is unable to climb at the flight plan interval under consideration, or if a reasonable altitude gain remains insufficient to remove the excessive sonic boom prediction, flight planning system 10 may consider other, less optimal solutions. For example, system 10 may now consider solutions involving A/C deceleration to subsonic speeds. This solution (deceleration to subsonic speeds) may be prioritized below changes in altitude due to the fuel expenditure typically required to regain supersonic speeds. In many cases, however, it will be unnecessary to decelerate to subsonic speeds to avoid the production of a sonic boom. Instead, there will typically exist a so-called "Mach cutoff speed" at which the generation of a sonic boom is avoided. The particular value of the Mach cutoff speed varies in conjunction with atmospheric conditions, but will typically be slightly greater than Mach 1. Accordingly, embodiments of flight planning system 10 may initially consider, as preferred solution, A/C deceleration to a speed remaining slightly above the Mach cutoff speed. In rendering this assessment, flight planning system 10 may determine the calculated Mach cutoff speed at a given point in space from an algorithm, which may be performed by flight planning system 10 or by a remote entity in communication with system 10; e.g., as previously noted, flight planning system 10 utilize datalink 24 to submit a "what-if" queries to a remote entity dedicated to carrying-out relatively complex sonic boom forecasting algorithms. Flight planning system 10 may then utilize such data, as returned by the remote entity and specifying the Mach cutoff speed at a particular point in space, in performing the process task described herein. Flight planning system 10 may submit such "what-if" queries on a relatively frequent basis to compensate for changes in dynamic parameters impacting the Mach cutoff speed calculation, such changes in forecast A/C speeds and weather (e.g., wind) conditions. Finally, if no navigational solutions are found during STEP 44 of method 36, an advisory message or other notification may be generated indicating that system 10 was unable to construct a boom-regulated flight plan c satisfying the entered flight plan criteria.

Progressing next to STEP 46 of method 36, it is ascertained whether flight planning system 10 was successful in establishing a boom-regulated flight plan. If able to successfully arrive at a boom-regulated flight plan, flight planning system 10 may present the boom-regulated flight plan for pilot approval prior to final FMS submission (STEP 50). In an embodiment, the relevant fields of the FMS may be populated such that the boom-regulated flight plan parameters are entered into the FMS upon selection of a "SUBMIT" option by the pilot. Otherwise, the boom-regulated flight plan may be atomically entered into the FMS or other avionic suite component during STEP 50. System 10 may submit the flight plan and any navigational commands associated therein to the pertinent flight deck systems in a suitable format, such as Aeronautical Radio Incorporated (ARINC) 429. Method 36 may conclude with final entry of the boom-regulated flight plan. If unable to construct a boom-regulated flight plan, flight planning system 10 progresses to STEP 48 and generates a corresponding visual notification on avionic displays 32. Such a visual notification can include symbology relating pertinent information to a pilot or other viewer, such as the location at which the excessive sonic boom is projected to originate or to first strike a surface of the Earth. Additionally or alternatively, graphics can be generated on the avionic display presented suggested rerouting options satisfying the flight plan criteria and avoiding the forecast occurrence of an excessive sonic boom. Examples of graphics that may be generated by flight planning system 10 during STEP 48 of method 36 will now be described in conjunction with FIGS. 3-4.

Figure 3:
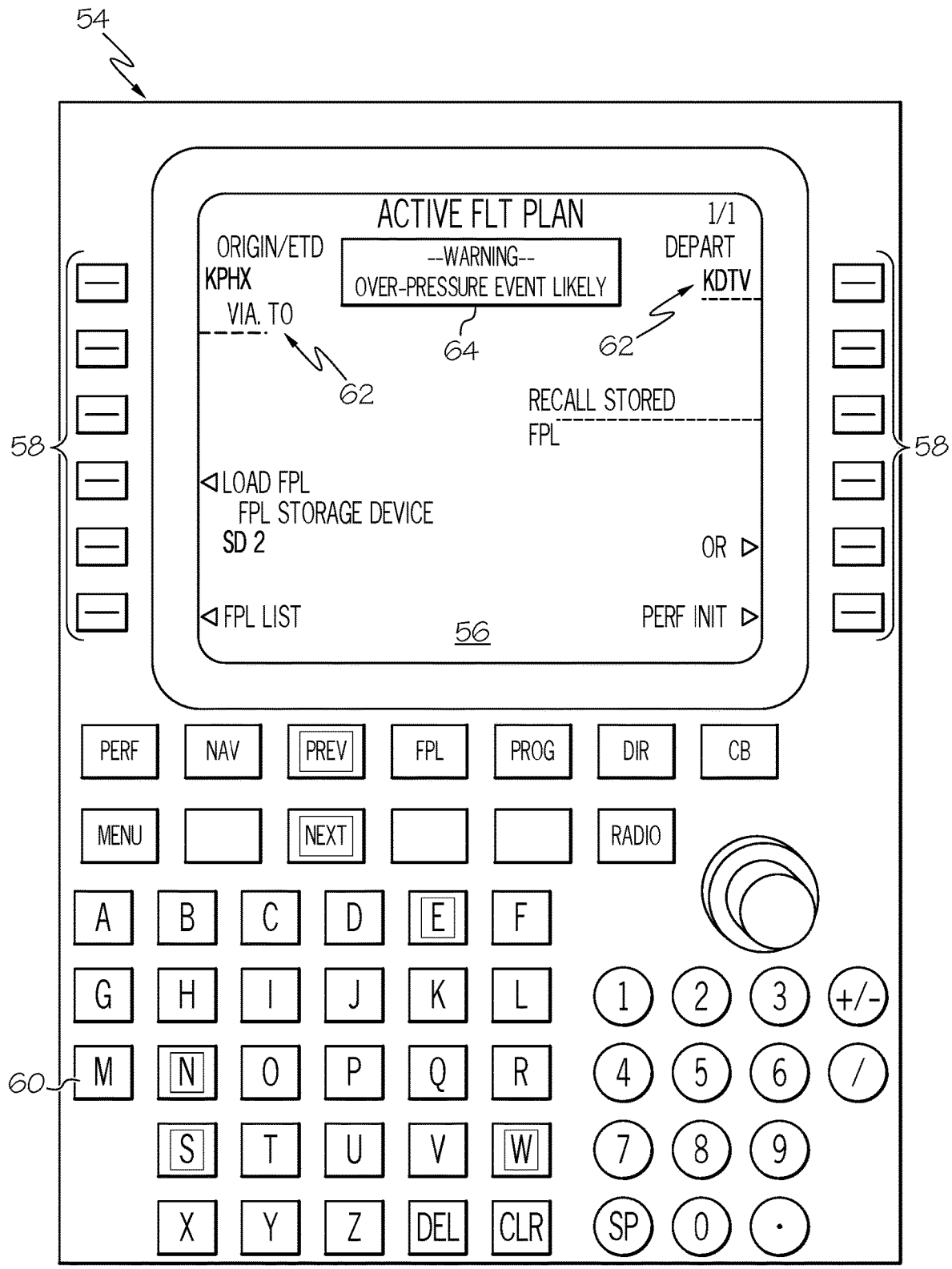
FIG. 3 depicts an exemplary Multifunction Control and Display Unit (MCDU), which may be utilized as a pilot interface of the flight planning system of FIG. 1 in an exemplary embodiment.

FIG. 3 illustrates an MCDU 54, which can be utilized as an input device and display device of flight planning system 10 shown in FIG. 1 in an embodiment. In the illustrated embodiment, MCDU 54 includes a display screen 56, a number of command line buttons 58 arranged in two columns on opposing sides of screen 56, an alphanumeric keypad 60 located beneath screen 56, and various other inputs. MCDU 54 allows alphanumeric input data, such as flight plan criteria 62, to be entered by a pilot into flight planning system 10 during the initial stages of supersonic flight planning. As indicated in an upper portion of FIG. 3, a notification 64 can be presented on display screen 56 when system 10 is unable to establish a boom-regulated flight plan satisfying the entered flight plan criteria. In this particular example, notification 64 is generated as text annunciation warning that an excessive sonic boom or overpressure event is predicted to occur if the flight plan is executed without modification. In other embodiments, such a notification can vary in appearance and be produced on a different type of display is addition to or in lieu of display 56. Further, in certain implementations, flight planning system 10 may also other generate other graphics aiding in pilot assessment and decision making when advising of an excessive sonic boom prediction. Such graphics can include, for example, symbology presenting one or more alternative (detoured) flight plans terminating at a desired ending waypoint, while averting excessive sonic boom generation. An example of such symbology is further discussed below in conjunction with FIG. 4.

Figure 4:
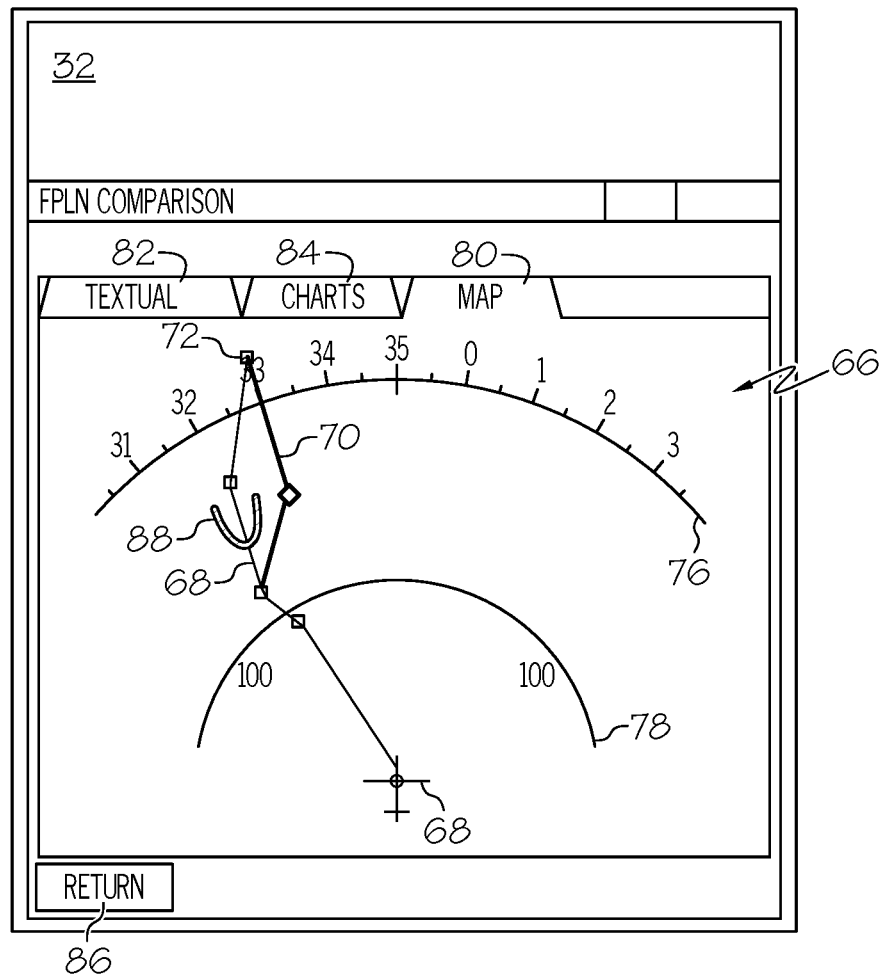
FIG. 4 is a screenshot of an avionic display including graphics aiding in supersonic flight planning, as be generated by the flight planning system of FIG. 1 when implementing the method of FIG. 2 in an exemplary embodiment of the present disclosure.

FIG. 4 is a screenshot of a GUI including a flight plan comparison page 66, which may be generated on avionic display 32 by flight planning system 10 in a further exemplary embodiment of the present disclosure. Flight plan comparison page 66 visually plots a first or primary flight plan 68 and a second or alternative flight plan 70, which have been generated by system 10 based upon entered flight plan criteria. The depicted flight plans are superimposed over a map view presented from, for example, a two-dimensional planform perspective, although it will be appreciated that other perspectives are possible (e.g., a forward-looking, three dimensional perspective). The flight plans may be distinguished utilizing distinctive waypoint markers as shown. If desired, other graphics may be provided on map view, including, for example, an A/C graphic 74, a heading graphic 76, a range ring graphic 78, and various symbols indicative of terrain, weather, and structures (not shown for clarity). Flight plan comparison page 66 may have a selection tab 80 associated therewith, which may be utilized in conjunction with other selections tabs 82, 84 to navigate between other pages. A virtual return button 86 may also be provided to return to the last page viewed.

As indicated in FIG. 4 by sonic boom symbol 88, an excessive sonic boom is predicted should primary flight plan 68 be executed as originally generated. Thus, flight planning system 10 further presents alternative flight plan 70, which terminates at the desired end waypoint, but which averts the potential occurrence of an excessive sonic boom or overpressure event. Sonic boom symbol 88 visually identifies the approximate location at which the excessive sonic boom is predicted to occur. Sonic boom symbol 88 may be generated as, for example, a graphic or icon having a generally parabolic shape, which is reminiscent of a wave front seen in two dimensions. If desired, sonic boom symbol 88 may be visually coded to convey additional information pertaining to the overpressure event prediction, such as the predicted likelihood and/or the maximum possible severity of the excessive sonic boom, as estimated by system 10; e.g., as indicated in FIG. 4 by crosshatching, sonic boom symbol 88 may be color coded as a function of a maximum possible severity of the overpressure event, as determined by the disparity between a magnitude of the sonic boom prediction and the boom tolerance threshold. If desired, additional excessive sonic boom symbology may also be generated on avionic display devices 14 to convey other relevant information pertaining to predicted overpressure events. For example, additional symbology can be generated to identify ground strike locations at which the pressure waves generated by anticipated overpressure events are projected to impinge the earth. Further, in embodiments, flight planning system 10 may also enable a pilot or other user to select sonic boom symbol 88 in some manner (e.g., utilizing a GUI cursor) to summon additional information pertaining to the sonic boom prediction represented by symbol 88, such as a general direction of pressure wave propagation, an estimated amplitude (pressure or decibel level) of the sonic boom, or other such parameters.

In the case of the example shown in FIG. 4, and generally in the scenarios discussed throughout this document, flight planning system 10 may automatically enter or implement relatively minor offsets to the flight plan to avoid excessive boom predictions or anticipated overpressure events, in some embodiments. For example, flight planning system 10 may be configured to automatically enter minor flight plan adjustments if satisfying certain constraints as determined by, for example, airway boundaries, Required Navigational Performance (RNP) parameters, and the like. More pronounced deviations from a flight plan, however, will typically require pilot notification and approval. In some cases, it may also be necessary to communicate with and gain approval from an ATC when considering amending a previously-filed flight plan or performing a relatively large flight plan excursion to avoid the anticipated occurrence of an overpressure event. Again, proper notifications and visual cues may be produced on one or more of avionic display devices 14 (FIG. 1) if this should be the case. However, in the majority of scenarios, overpressure event predictions can be removed or resolved through changes in airspeed or relatively minor adjustments in altitude, without large excursions from a flight plan. Thus, such additional notifications and pilot interaction will often be unnecessary and the corrective or preemptive actions performed by flight planning system 10 will remain transparent to the pilot.

Conclusion

The foregoing has thus provided flight planning systems for generating boom-regulated flight plans; that is, flight plans having segments that, while calling for supersonic A/C flight, are not predicted to result in excessive sonic booms or overpressure events. By integrating sonic boom prediction data into the flight planning process, the flight planning system enables reductions in the occurrence of excessive sonic booms during supersonic A/C flight. Embodiments of the flight planning system provide this functionality, while remaining largely or wholly transparent to a pilot under most circumstances. Further, in instances in which a boom-regulated flight plan cannot be established, or in instances in which relatively large deviations from an initially-generated flight plan are required to remove an excessive sonic boom prediction, the flight planning system may duly notify a pilot and provide penitent information helpful in discerning an acceptable solution to address the excessive sonic boom prediction. As a still further advantage, embodiments of the flight planning system may retrieve sonic boom prediction data from a remote entity, when appropriate, which is dedicated to the performance of relatively complex, computationally-intensive sonic boom forecasting algorithms. By offboarding such calculations, the flight planning system can determine with a relatively high level of confidence whether a boom-regulated flight plan is available for a given set of flight plan criteria, while the processing loads placed on the system are minimized.

Although an exemplary embodiment of the present disclosure has been described above in the context of a fully-functioning computer system (e.g., flight planning system 10 described above in conjunction with FIGS. 1-4), those skilled in the art will recognize that the mechanisms of the present disclosure are capable of being distributed as a program product (e.g., an Internet-disseminated program or software application) and, further, that the present teachings apply to the program product regardless of the particular type of computer-readable media (e.g., hard drive, memory card, optical disc, etc.) employed to carry-out its distribution. In certain implementations, the flight planning system may include GUI components, such as ARINC 661 components, which may include a User Application Definition File ("UADF"). As will be appreciated by one skilled in the art, such a UADF is loaded into the light planning system and defines the "look and feel" of the display, the menu structure hierarchy, and various other static components of the GUI with which a pilot or other user interacts.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A method carried-out by a flight planning system including a display device and a pilot input interface, the method comprising:
   generating a baseline flight plan, which includes at least one supersonic flight plan segment, in accordance with flight plan criteria entered via the pilot input interface;
   determining, in the flight planning system, that an overpressure event is forecast to occur at a selected interval along the supersonic flight plan segment due to a predicted sonic boom having a magnitude exceeding a boom tolerance threshold;
   determining, in the flight planning system, whether the forecast overpressure event can be resolved through an acceptable modification to the baseline flight plan;
   generating a modified flight plan, in the flight planning system, with an acceptable modification to the baseline flight plan when the forecast overpressure event can be resolved through the acceptable modification and causing the modified flight plan to be entered into appropriate aircraft avionics associated with an aircraft, wherein the modified flight plan is executed during supersonic flight by the aircraft; and
   generating a corresponding visual notification of the overpressure event on the display device when the overpressure event cannot be resolved through an acceptable modification to the baseline flight plan.

2. The method of claim 1, wherein the causing the modified flight plan to be entered into appropriate flight control equipment comprises displaying the modified flight plan for pilot approval via the display device and entering the modified flight plan into the appropriate aircraft avionics equipment upon receipt of pilot approval via the pilot interface device.

3. The method of claim 1 further comprising:
   if determining that the forecast overpressure can be resolved by any one of multiple acceptable modifications to the baseline flight plan, identifying, in the flight planning system, an optimal flight plan modification from the multiple acceptable modifications; and
   modifying the baseline flight plan, in the flight planning system, in accordance with the optimal flight plan modification.

4. The method of claim 3 wherein identifying an optimal flight plan modification comprises prioritizing flight plan modifications involving aircraft deceleration to supersonic speeds over flight plan modifications involving alterations to aircraft altitude.

5. The method of claim 3 wherein identifying an optimal flight plan modification comprises prioritizing flight plan modifications involving limited alterations to aircraft altitude over flight plan modifications involving aircraft deceleration to subsonic speeds.

6. The method of claim 1 wherein the flight planning system comprises a datalink, and wherein determining comprises:
   sending requests for sonic boom prediction data to a remote entity over the datalink; and
   receiving, in return, the requested sonic boom prediction data from the remote entity.

7. The method of claim 6 wherein sending comprises including, in the request for sonic boom prediction data, information denoting projected aircraft parameters at the selected intervals along the supersonic flight plan segment.

8. The method of claim 1 further comprising assigning a value, in the flight planning system, to the boom tolerance threshold based, at least in part, on a projected origin of the predicted sonic boom.

9. The method of claim 1 further comprising assigning, in the flight planning system, a value to the boom tolerance threshold based, at least in part, on a projected ground strike location of the predicted sonic boom.

10. The method of claim 1 further comprising assigning, in the flight planning system, a value to the boom tolerance threshold based, at least in part, on a time of day at which the predicted sonic boom is forecast to occur.

11. The method of claim 1 wherein generating comprises producing the corresponding visual notification to include symbology generally identifying a geographical location at which the predicted sonic boom is forecast to occur.

12. A flight planning system deployed onboard an aircraft capable of supersonic flight, the planning system comprising:
a wireless datalink; and
a controller architecture coupled to the wireless datalink, the controller architecture configured to:
via the wireless datalink, transmit requests to a remote entity for sonic boom forecast data based upon aircraft flight parameters at intervals along a flight plan containing at least one supersonic flight plan segment;
utilize the sonic boom forecast data received from the remote source to determine that an overpressure event is forecast to occur as the aircraft executes the flight plan;
determine whether the forecast overpressure event can be preempted by acceptable changes to the flight plan;
alter the flight plan in accordance with the acceptable modifications, when such overpressure events can be preempted through acceptable modifications to the flight plan; and
cause the modified flight plan to be entered into appropriate aircraft avionics, wherein the modified flight plan is executed during supersonic flight by the aircraft.

13. The flight planning system of claim 12 wherein the controller architecture is configured to determine whether any forecast overpressure events by requesting additional sonic boom data from the remote entity based upon proposed adjustments to aircraft speed, aircraft altitude, or a combination thereof.

14. The flight planning system of claim 12 further comprising a display device coupled to the controller architecture;
wherein the controller architecture is further configured to generate an alert on the display device if determining that one or more forecast overpressure events cannot be preempted through acceptable modification to the flight plan, altering the flight plan in accordance with the acceptable modifications.

15. A flight planning system, comprising:
a display device;
a pilot input interface; and
a controller architecture coupled to the display device and to the pilot input interface, the controller architecture configured to:
generate a baseline flight plan, which includes at least one supersonic flight plan segment, in accordance with flight plan criteria entered via the pilot input interface;
determine that an overpressure event is forecast to occur at a selected interval along the supersonic flight plan segment due to a predicted sonic boom having a magnitude exceeding a boom tolerance threshold;
determine whether the forecast overpressure event can be resolved through an acceptable modification to the baseline flight plan;
generate a modified flight plan with an acceptable modification to the baseline flight plan when the forecast overpressure event can be resolved through the acceptable modification and cause the modified flight plan to be entered into appropriate aircraft avionics associated with an aircraft, wherein the modified flight plan is executed during flight by the aircraft; and
generate a corresponding visual notification of the overpressure event on the display device when the overpressure event cannot be resolved through an acceptable modification to the baseline flight plan.

16. The flight planning system of claim 15 wherein the controller architecture is configured to determine whether an overpressure event is predicted to occur at selected intervals along the supersonic flight plan segment by retrieving sonic boom forecast data from a remote entity in wireless communication with the flight planning system.

17. The flight planning system of claim 16 wherein the controller architecture is further configured to, when an overpressure event is forecast to occur during the supersonic portions of the flight plan, determine whether the forecast overpressure event can be avoided by decreasing aircraft speed, increasing aircraft altitude, or a combination thereof.

18. The flight planning system of claim 15 wherein the controller architecture is further configured to:
retrieve sonic boom forecast data indicating an estimated magnitude of a predicted sonic boom; and
determine that an excessive sonic boom is predicted to occur when the estimated magnitude exceeds the boom tolerance threshold.

19. The flight planning system of claim 18 wherein the controller architecture is further configured to:
identify a geographical location corresponding to the predicted sonic boom; and
assign a value to the boom tolerance threshold based, at least in part, on the identified geographical location.

20. The flight planning system of claim 15 wherein the controller architecture is configured to generate the visual notification to include symbology identifying a geographical location at which excessive sonic boom is projected to occur.

* * * * *